United States Patent [19]
Watanabe et al.

[11] Patent Number: 6,079,466
[45] Date of Patent: *Jun. 27, 2000

[54] PNEUMATIC TIRE WITH AIR PERMEATION PREVENTION LAYER

[75] Inventors: Jiro Watanabe; Tetsu Kitami, both of Hiratsuka, Japan

[73] Assignee: The Yokohama Rubber Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/614,882

[22] Filed: Mar. 13, 1996

[30] Foreign Application Priority Data

Mar. 15, 1995 [JP] Japan ................................. 7-055929

[51] Int. Cl.$^7$ ........................................................ B60C 5/14
[52] U.S. Cl. .................... 152/510; 152/548; 152/DIG. 16
[58] Field of Search ....................................... 152/510, 511, 152/DIG. 16, 548; 156/110.1, 123, 133; 264/171.28, 173.14, 173.19

[56] References Cited

U.S. PATENT DOCUMENTS

| | | |
|---|---|---|
| 3,857,754 | 12/1974 | Hirata et al. ........................ 264/171.28 |
| 4,120,928 | 10/1978 | Furukawa et al. .................... 264/210.7 |
| 4,410,482 | 10/1983 | Subramanian ....................... 264/171.28 |
| 4,770,837 | 9/1988 | Lu et al. ............................. 264/171.28 |
| 4,928,741 | 5/1990 | Rye et al. . |

FOREIGN PATENT DOCUMENTS

| | | |
|---|---|---|
| 0 337 279 | 10/1989 | European Pat. Off. . |
| 0 376 558 | 7/1990 | European Pat. Off. . |
| 0 633 152 | 1/1995 | European Pat. Off. . |
| 4126451 | 2/1993 | Germany ................................ 152/510 |
| 4-5104 | 1/1992 | Japan .................................... 152/510 |
| 5-169909 | 7/1993 | Japan .................................... 152/510 |
| 5-278409 | 10/1993 | Japan .................................... 152/510 |
| 6-40207 | 2/1994 | Japan . |
| 2 023 516 | 1/1980 | United Kingdom . |

*Primary Examiner*—Geoffrey L. Knable
*Attorney, Agent, or Firm*—Finnegan, Henderson, Farabow, Garrettt & Dunner, L.L.P.

[57] ABSTRACT

A method for preventing air permeation from a pneumatic tire wherein there is arranged inside the tire an air permeation preventive layer formed of a thermoplastic resin film produced by mixing and extruding at least two thermoplastic resins which are incompatible with each other, the film having a matrix phase of a first of the resins in which there is dispersed a dispersed phase having an oriented lamellar structure and formed of a second of the resins, wherein the ratio of melt viscosity of the second resin to that of the first resin at the molding temperature of the incompatible thermoplastic resins is preferably 1.5 to 20.

8 Claims, 1 Drawing Sheet

PNEUMATIC TIRE WITH AIR PERMEATION PREVENTION LAYER

BACKGROUND OF THE INVENTION

1. Field of the Invention

The present invention relates to a pneumatic tire having an air permeation preventive layer capable of reducing the weight of the tire, without impairing the retention of air pressure in the tire, and of reducing the cost of manufacturing a pneumatic tire by improving the air permeation preventive layer such as an inner liner layer.

2. Description of the Related Art

The reduction of fuel consumption is one of the major technical targets in the automobile industry. There have been increasingly stronger demands for reducing the weight of the pneumatic tires for this purpose. The inner surface of a pneumatic tire is provided with an inner liner layer composed of a low gas permeable rubber such as halogenated butyl rubber so as to enable the tire air pressure to be held constant. A halogenated butyl rubber, however, suffers from a large hysteresis loss. Thus, after vulcanization of the tire, there are waves formed in the inner surface rubber of the carcass layer and the inner liner layer in the space between the carcass cords and the inner liner rubber layer deforms along with the deformation of the carcass layer, and therefore, there is the problem that the rolling resistance increases. For this reason, the inner liner layer (e.g., halogenated butyl rubber) and inner surface rubber of the carcass layer are generally joined through a rubber sheet called a tie gum with a small hysteresis loss. Accordingly, in addition to the thickness of the inner liner layer of the halogenated butyl rubber, there is added the thickness of the tie gum and the layer, as a whole, becomes a thickness of over 1 mm (1000 $\mu$m). As a result, this becomes one factor increasing the weight of the final tire product.

Various techniques have been proposed for using various materials in place of the low gas permeable rubber such as butyl rubber as the air permeation preventive layer such as an inner liner layer of the pneumatic tire. For example, Japanese Unexamined Patent Publication (Kokai) No. 6-40207 proposes to provide an air permeation preventive layer at the inside of a tire by forming a thin film by laminating a low air permeation layer composed of a polyvinylidene chloride film or ethylene-vinyl alcohol copolymer film and a bonding layer composed of a polyolefin film, aliphatic polyamide film, or polyurethane film, laminating this thin film on the inner surface of a green tire composed of unvulcanized rubber so as that the bonding layer contacts the carcass layer, then vulcanizing the green tire. Use of such a multilayer film as the air permeation preventive layer enables the thickness of the air permeation preventive layer to be reduced from the conventional layer and enables the reduction of the weight of the tire, without impairing the retention of the air pressure. However, this air permeation preventive layer requires large equipment requiring several extrusion machines for making the multilayer film, and therefore, suffers from a large installation space, high manufacturing costs, and difficulty of controlling the molding temperature and the molding speed when forming the multilayer film, and therefore, the careful attention should be made for stable manufacture.

As explained above, the multilayer film for the air permeation preventive layer as described in Japanese Unexamined Patent Publication (Kokai) No. 6-40207 may be superior in performance, but has problems in manufacturing costs and working efficiency.

SUMMARY OF THE INVENTION

Accordingly, the object of the present invention is to reduce the manufacturing costs of the film for forming the air permeation preventive layer and the space required for its manufacturing equipment and to improve the manufacturing efficiency.

In accordance with the present invention there is provided a method for preventing air permeation from a pneumatic tire, wherein there is arranged inside the tire an air permeation preventive layer formed of a thermoplastic resin film produced by mixing and extruding at least two thermoplastic resins which are incompatible with each other, the film comprising a matrix phase of a first of the resins having dispersed therein a dispersed phase having an oriented lamellar structure and formed of a second of the resins.

In accordance with the present invention, there is also provided a process for producing a pneumatic tire comprising laminating a film comprising the above-mentioned oriented lamellar structure of polymer (i) on an unvulcanized green tire, followed vulcanizing to form the integrated tire.

BRIEF DESCRIPTION OF THE DRAWINGS

The present invention will now be better understood from the following explanation made with reference to the attached FIG. 1 illustrating a semi-cross-sectional view along the meridian direction showing the structure of an inner liner part of a pneumatic tire according to the present invention.

DESCRIPTION OF THE PREFERRED EMBODIMENTS

Figure 1:
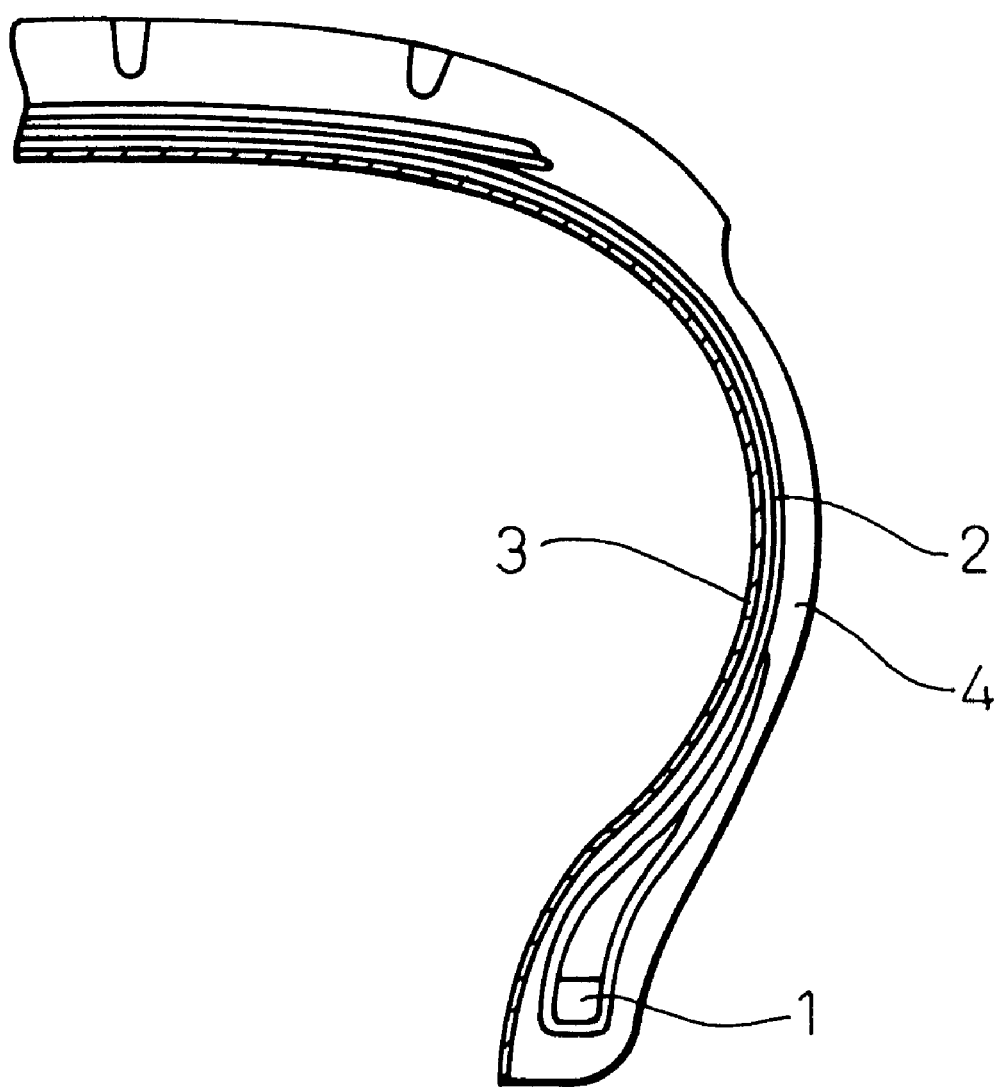

The present invention will be explained in further detail below.

The film usable for forming the air permeation preventive layer of the pneumatic tire according to the present invention has an air permeation coefficient, at 30° C., of not more than $25 \times 10^{-12}$ cc·cm/cm$^2$·s·cmHg, preferably $5 \times 10^{-12}$ cc·cm/cm$^2$·s·cmHg or less, a Young's modulus of 1 to 2500 MPa, preferably 100 to 2500 MPa, a film thickness of 0.02 to 1 mm, preferably 0.05 to 0.5 mm, and a product of the film thickness and Young's modulus of not more than 500 MPa·mm, preferably 10 to 300 MPa·mm.

The film for forming the air permeation preventive layer of the pneumatic tire according to the present invention may be produced by extruding a blend of at least two incompatible thermoplastic resins. The ratio of melt viscosities of the oriented lamellar structure of polymer (i)/matrix (ii) at the molding temperature of the incompatible thermoplastic resins is preferably 1.5 to 20, more preferably 3 to 20.

The ratio of the length and thickness and the ratio of the width and thickness of the oriented lamellar structure of polymer dispersed in the film comprising the air permeation preventive layer of the pneumatic tire according to the present invention is preferably at least 10, more preferably 10 to 100, respectively.

The combination of the two or more incompatible thermoplastic resins used when making the film for forming the air permeation preventive layer of the pneumatic tire according to the present invention is not particularly limited so long as it is a combination capable of producing a film having an oriented lamellar structure of polymer dispersed therein by extrusion or extrusion sheet formation and, if necessary, drawing, but the following may be mentioned as specific examples.

A preferable example of the film for the air permeation preventive layer according to the present invention is a combination of (i) a polyolefin or modified polyolefin resin as the preferable thermoplastic resin A comprising the matrix (preferably 60 to 95% by weight, more preferably 70 to 90% by weight) and (ii) a polyamide resin, polyvinyl resin, or polyester resin as the preferable thermoplastic resin B having an air permeation preventive function comprising the oriented lamellar structure of polymer dispersed in the matrix (preferably 5 to 40% by weight, more preferably 10 to 30% by weight).

Another preferable example of the film for the air permeation preventive layer according to the present invention is a combination of (i) a polyamide resin as the preferable thermoplastic resin A comprising the matrix (preferably 60 to 95% by weight, more preferably 70 to 90% by weight) and (ii) a polyvinyl resin or a polyamide resin incompatible with said polyamide resin as the preferable thermoplastic resin B having an air permeation preventive function comprising the oriented lamellar structure of polymer dispersed in the matrix (preferably 5 to 40% by weight, more preferably 10 to 30% by weight).

Preferable examples of the polyolefin or modified polyolefin resin include high density polyethylene (HDPE), medium density polyethylene (MDPE), low density polyethylene (LDPE), polypropylene (PP), ethylene-propylene copolymers (EPM), ethylene-vinyl acetate copolymers (EVA), ethylene-acrylic acid copolymers (EAA), ethylene-methylacrylate copolymers (EMA), ethylene-ethylacrylate copolymers (EEA), ethylene-butylacrylate copolymers (EBA), ethylene-methylmethacrylate copolymers (EMMA), etc.

Preferable examples of the polyamide resin include nylon 6, nylon 66, nylon 46, nylon 11, nylon 12, nylon 610, nylon 612, nylon 6/66 copolymers, nylon 6/66/610 copolymers, nylon MXD6, nylon 6T, nylon 6/6T copolymers, amorphous nylon, etc.

Preferable examples of the polyvinyl resin include vinyl acetate, polyvinyl alcohol (PVA), vinyl alcohol/ethylene copolymers (EVOH), polvinylidene chloride (PVDC), polyvinyl chloride (PVC), vinyl chloride/vinylidene chloride copolymers, vinylidene chloride/methylacrylate copolymers, vinylidene chloride/acrylonitrile copolymers, etc.

Preferable examples of the polyester resin include polybutylene terephthalate (PBT), polyethylene terephthalate (PET), polyethylene isophthalate (PEI), PET/PEI copolymers, polyacrylate (PAR), polybutylene napthtalate (PBN), liquid crystal polyesters, polyester elastomers, polycarbonate (PC), etc.

The method for forming the film for the air permeation preventive layer according to the present invention may be any method for forming a film which is ordinarily used, but at least two types of the incompatible thermoplastic resins A and B explained above are kneaded and blended by any method using, for example, a kneading extruder and, for example, pelletized. Thereafter, the blend is extruded through a T-die using, for example, a resin extruder and, if necessary, is drawn in the extrusion direction (X) and width direction (Y) so as to obtain a film having the matrix resin A and the thermoplastic resin B dispersed uniformly as an oriented lamellar structure of polymer. The extrusion temperature may be suitably determined according to the combination of the thermoplastic resins used. The extruded film is drawn 10 to 1000%, preferably 50 to 300%, in preferably the X and Y directions by an ordinary method so as to give an air permeation preventive function to the matrix resin A and obtain a film with the thermoplastic resin B incompatible with the matrix resin A uniformly dispersed as an oriented lamellar structure of polymer extending flat in the XY directions. Note that to enhance the interlayer bonding of the matrix resin (ii) and the oriented lamellar structure of polymer (i), a general compatibilizer agent may be blended in according to need.

The adhesion or bonding between the film and the facing rubber layer may be performed using a conventional chlorinated rubber, phenol resin, or isocyanate adhesive and by the heat and pressure at the time of vulcanization and molding. These adhesives include, for example, phenol resin types (Chemlock 220), chlorinated rubber types (Chemlock 205), and isocyanate types (Chemlock 402).

Examples of such a compatibilizer are copolymers having the structure of either one or both of the two types of thermoplastic resins or those having the structure of a copolymer with a reactable group with the thermoplastic resin or elastomer component, such as an epoxy group, carbonyl group, halogen group, amino group, oxazoline group, hydroxyl group, etc. These may be selected according to the type of the thermoplastic resin and elastomer component to be blended, but normally an SEBS and its maleic acid modified products, EPDM/stryene or EPDM/acrylonitrile graft copolymers and their maleic acid modified products, styrene/maleate copolymers, reactive phenoxy resins, etc. may be used. The amount of the compatibilizer is not particularly limited, but preferably is 0.5 to 10 parts by weight, based on 100 parts of the polymer component (i.e., total amount of thermoplastic resin and elastomer component).

The present invention having the air permeation preventive layer according to the present invention will be explained in further detail.

The air permeation preventive layer of the pneumatic tire according to the present invention may be arranged at any location inside the tire, that is, at the inside or outside of the carcass layer or at any other location. The point is that it should be arranged so as to prevent the permeation and diffusion of air from the inside of the tire and enable the air pressure inside the tire to be held for a long period of time, whereby the object of the invention can be achieved.

FIG. 1 is a semi-cross-sectional view along the meridian direction illustrating a typical example of the arrangement of an air permeation preventive layer 3 of a pneumatic tire. In FIG. 1, a carcass layer 2 spans between the left and right bead cores 1 and 1. On the tire inner surface at the inside of the carcass layer 2 is provided an air permeation preventive layer 3. The air permeation preventive layer 3 is composed of the above-mentioned film according to the present invention. In FIG. 1, 4 shows a sidewall.

Regarding the process for producing a pneumatic tire having an air permeation preventive layer composed of a film according to the present invention, as shown in FIG. 1, explaining the example of the case of arranging the air permeation preventive layer 3 at the inside of the carcass layer 2, the film of the present invention is wrapped around a tire forming drum and joined to make a cylindrical shape. On top of this are then successively laminated a carcass layer composed of unvulcanized rubber, a belt layer, a tread layer, and other members used for the production of usual tires, then the drum is withdrawn to obtain a green tire. Thereafter, this green tire is heated and vulcanized in accordance with an ordinary method to make a desired light weight pneumatic tire at low cost. Note that the same type of process may be followed even when providing the air permeation preventive layer on the outer circumference of the carcass layer.

The material of the rubber layer for lamination of the air permeation preventive layer according to the present invention is not particularly limited. Any rubber material which has been generally used as a conventional rubber material for a tire may be used. Examples of such a rubber are rubber compositions composed of diene rubbers such as NR, IR, BR, and SBR, halogenated butyl rubbers, ethylene-propylene copolymer rubbers, styrenic elastomers, etc. to which have been added conventional additives such as carbon black, process oil, and vulcanization agents.

EXAMPLES

The present invention will now be further explained in detail, but is by no means limited to, the following Examples.

Examples 1 to 8 and Comparative Examples 1 and 2

The formulations of Table I were kneaded by a single screw extruder for resin having a mixing screw to form pellets. Thereafter, these were extruded through a T-die at the molding temperatures shown in the Table, followed by drawing at 200% in the XY direction to produce films having 360 mm width and a predetermined thickness. The resultant films were cut and observed in their cross-sections by a polarization microscope and the ratios of the length and thickness of the layer of the oriented lamellar structure of polymer produced in the film were found. The air permeation coefficient and the Young's modulus of the resultant films were measured, as follows:

Method for Determining Air Permeation Coefficient of Film
According to JIS K7126 "Test Method of Gas Permeability of Plastic Films and Sheets (Method A)".
Test piece: Samples of films prepared in the Examples were used as they were.
Test gas: Air ($N_2:O_2=8:2$)
Test temperature: 30° C.

Method for Determining Young's Modulus of Film
According to JIS K6251 "Tensile Test Method of Vulcanized Rubber".
Test piece: The film samples prepared in the Examples were punched into JIS No. 3 dumbbell shapes in parallel to the direction of flow of the resin during the extrusion of the films. A tangent was drawn to the curve of the initial strain area of the resultant stress-strain curve and the Young's modulus was found from the inclination of the tangent.

Method for Determining Ratio of Viscosity
A capillary type rheometer was used to measure the melt viscosities at the molding temperatures of the compositions shown in Table I at a sheer rate of 100/sec and the ratios of viscosities of the resins forming the matrix and the oriented lamellar structure of polymer were calculated.

Thereafter, the films were wrapped around tire molding drums, the tire members were laminated on the top thereof, then the assemblies were inflated to make green tires which were then vulcanized at 185° C. at 2.3 MPa for 15 minutes to produce tires having the tire size 165SR13. The finished tires were subjected to a durability test, air leakage test, and measurement of the inner liner weight as follows. The results are shown in Table I.

Tire Durability Test
A 165SR13 steel radial tire (rim 13×4½-J) was used and run for 10,000 km on actual roads under the conditions of an air pressure of 140 kPa and a load of 5.5 kN.
After the run, the tire was removed from the rim and the liner layer inside the tire was visually observed. Tires with fissures, cracks, visible wrinkles, peeling or blistering of the liner layer, etc. at the liner layer were judged as defective (x) while those without them were judged as passing (○).

Tire Air Leakage Performance Test Method
A 165SR13 steel radial tire (rim 13×4½-J) was used, allowed to stand at an initial pressure of 200 kPa under no-load conditions at room temperature 21° C. for 3 months, and measured as to pressure every four day interval.
When the measured pressure is Pt, the initial pressure is Po, and the number of days elapsed is t, the value α is found by recurrence of the function:

$$Pt/Po=\exp(-\alpha t)$$

The α thus obtained is used and t=30 substituted in the following formula to obtain β:

$$\beta=[1-\exp(-\alpha t)]\times 100$$

This value β is considered the rate of reduction of pressure per month (%/month).

Comparative Example 3

The properties of the inner liner and the properties of a finished tire using a butyl rubber shown in the Table below as the inner liner layer in place of the film of the present invention were measured and the results shown in Table I.

| Butyl Inner Liner Formulation | |
|---|---|
| Br-IIR*1 | 100 parts by weight |
| Carbon black GPF*2 | 60 |
| Stearic acid | 1 |
| Petroleum based hydrocarbon resin*3 | 10 |
| Paraffinic process oil*4 | 10 |
| No. 3 zinc white | 3 |
| Accelerator | 1 |
| Sulfur | 0.6 |

*1: Exxon Bromobutyl 2244 (Exxon Chemical)
*2: Seast V (Tokai Carbon)
*3: Escorez 1102 (Esso Chemical)
*4: Machine oil (Showa Shell Sekiyu)

TABLE I

| | Examples | | | | | | | | Comp. Ex. | | |
|---|---|---|---|---|---|---|---|---|---|---|---|
| | 1 | 2 | 3 | 4 | 5 | 6 | 7 | 8 | 1 | 2 | 3 |
| Formulation (parts by weight) | | | | | | | | | | | |
| HDPE*1 | 70 | — | — | 70 | 70 | — | — | — | 97 | — | Butyl rubber only |

TABLE I-continued

|  | Examples | | | | | | | | Comp. Ex. | | |
| --- | --- | --- | --- | --- | --- | --- | --- | --- | --- | --- | --- |
|  | 1 | 2 | 3 | 4 | 5 | 6 | 7 | 8 | 1 | 2 | 3 |
| EEA*2 | — | 70 | — | — | — | — | — | — | — | — | — |
| EMMA*3 | — | — | 70 | — | — | — | — | — | — | — | — |
| Nylon 6*4 | 30 | 30 | 30 | — | — | 70 | 70 | 70 | 3 | 70 | — |
| Amorphous nylon*5 | — | — | — | — | — | — | 30 | — | — | — | — |
| Nylon 610*6 | — | — | — | — | — | — | — | 30 | — | — | — |
| EVOH*7 | — | — | — | 30 | — | 30 | — | — | — | 30 | — |
| PBT*8 | — | — | — | — | 30 | — | — | — | — | — | — |
| Compatibilizer (*9) | — | — | — | 3 | 3 | — | — | — | — | — | — |
| Molding conditions | | | | | | | | | | | |
| Molding temp. (° C.) | 230 | 230 | 230 | 210 | 240 | 230 | 240 | 270 | 230 | 230 | |
| Viscosity ratio | 2.5 | 2.0 | 2.1 | 6.3 | 14.6 | 9.0 | 2.3 | 3.7 | 2.5 | 9.0 | |
| Film properties | | | | | | | | | | | |
| Layer length or width/thickness (average) | 73.4 | 110.1 | 92.5 | 52.1 | 14.8 | 42.3 | 80.1 | 66.5 | 98.2 | 40.6 | — |
| Film thickness (mm) | 0.12 | 0.12 | 0.12 | 0.12 | 0.12 | 0.05 | 0.05 | 0.05 | 0.12 | 0.60 | 0.80 |
| Air permeation coefficient × $10^{-12}$ (cc · cm/cm$^2$ · s · cmHg) at 30° C. | 12.7 | 13.6 | 12.9 | 6.7 | 17.3 | 0.2 | 0.6 | 0.7 | 46.7 | 0.2 | 58.2 |
| Young's modulus (MPa) | 957 | 821 | 788 | 1001 | 1331 | 921 | 854 | 728 | 989 | 921 | 12.2 |
| Film thickness × Young's modulus (MPa × mm) | 114.8 | 98.5 | 94.6 | 120.1 | 159.7 | 46.1 | 42.7 | 36.4 | 197.8 | 552.6 | 14.4 |
| Tire properties | | | | | | | | | | | |
| Durability | ◯ | ◯ | ◯ | ◯ | ◯ | ◯ | ◯ | ◯ | ◯ | Liner crack | ◯ |
| Liner weight (g) | 100 | 100 | 100 | 100 | 100 | 42 | 42 | 42 | 100 | 502 | 669 |
| Air leakage (%) | 2.8 | 2.9 | 2.8 | 1.8 | 3.0 | 0.2 | 0.5 | 0.6 | 5.7 | | 3.0 |

Footnotes to Table I
*1: Idemitsu Polyethylene 210J (Idemitsu Sekiyu Kagaku)
*2: DPDJ-6169 (Nippon Unicar)
*3: WD301 (Sumitomo Chemical)
*4: Amilan CM1041 (Toray)
*5: Novamid X21 (Mitsubishi Engineering Plastics)
*6: Amilan CM2001 (Toray)
*7: Eval EPE-105B (Kurarey)
*8: Ultradur B4550 (BASF)
*9: Modiper A (Nippon Oil and Fats)

Example 9 and Comparative Example 4

The equipment costs, space, and film physical properties when producing a multilayer film composed of the film of Example 1, nylon 6, high density polyethylene, and adhesives of the same were compared in Table II.

TABLE II

|  | Ex. 9 | Comp. Ex. 4 |
| --- | --- | --- |
| Formulation (parts by weight) | | |
| HDPE*1 | 70 | 70 |
| Nylon 6*2 | 30 | 30 |
| Adhesive*3 | — | 5 |
| Film thickness (mm) | 0.12 | 0.12 |
| Air permeation coefficient) × $10^{-12}$ (cc · cm/cm$^2$ · cmHg) at 30° C. | 12.7 | 12.1 |
| Young's modulus (MPa) | 957 | 962 |
| Equipment costs*4 | 50 | 100 |
| Equipment space*5 | 60 | 100 |

*1: Idemitsu Polyethylene 210J (Idemitsu Sekiyu Kagaku)
*2: Amilan CM1041 (Toray)
*3: Admer LF300 (Mitsui Sekiyu Kagaku)
*4: Costs for extruder, seating roll, and ancillary facilities expressed using equipment costs of Comparative Example 4 as 100.
*5: Floor area for extruder, seating roll, and ancillary facilities and work space expressed using floor space of Comparative Example 4 as 100.

As explained above, according to the present invention, it is possible to reduce the weight of a tire while keeping the retention of air pressure in the tire good and also to reduce the manufacturing costs of the tire through improvements in the air permeation preventive layer.

What is claimed is:

1. In a pneumatic tire having an air permeation preventive layer, the improvement wherein the layer is formed of a thermoplastic resin film formed of at least two incompatible resins,
    (a) the film comprising a matrix phase of a first of the resins having a dispersed, phase formed of a second of the resins dispersed in the matrix phase as an oriented lamellar structure,
    (b) the ratio of the melt viscosity of the second resin to that of the first resin, at a molding temperature of the resins, being from 1.5 to 20,
    (c) the air permeation coefficient of the film being not more than $25 \times 10^{-12}$ cc·cm/cm$^2$·s·cmHg at 30° C.,
    (d) the thickness of the film being in the range of from 0.02 to 1 mm, and
    (e) the product of the film thickness and the Young's modulus of the film being not more than 500 Mpa·mm.

2. A pneumatic tire as claimed in claim 1, wherein the film is produced by mixing aid extruding at least two thermoplastic resins which are incompatible with each other.

3. A pneumatic tire as claimed in claim 1, wherein the Young's modulus of the film is from 1 to 2500 Mpa.

4. A pneumatic tire as claimed in claim 1, wherein the lamellar structure of the dispersed phase has a ratio of length to thickness of at least 10.

5. A pneumatic tire as claimed in claim 1 wherein the film comprises (i) 60 to 95% by weight of a polyolefin or a modified polyolefin resin as the first resin, and (ii) 5 to 40% by weight of a polyamide resin, polyvinyl resin, or polyester resin as the second resin.

6. A pneumatic tire as claimed in claim 1, wherein the film comprises (i) 60 to 95% by weight of a polyamide resin as the first resin and (ii) 5 to 40% by weight of a polyamide resin incompatible with the polyamide resin (i), polyvinyl resin, or polyester resin, as the second resin.

7. A pneumatic tire as claimed in claim 1, wherein the lamellar structure of the dispersed phase has a ratio of length to thickness and a ratio of width to thickness of 10 to 100.

8. A pneumatic tire as claimed in claim 1, wherein the product of the film thickness and the Young's modulus of the film is 10 to 300 Mpa·mm.

* * * * *

UNITED STATES PATENT AND TRADEMARK OFFICE
CERTIFICATE OF CORRECTION

PATENT NO. : 6,079,466
DATED : June 27, 2000
INVENTOR(S) : Jiro WATANABE et al.

It is certified that error appears in the above-identified patent and that said Letters Patent is hereby corrected as shown below:

Claim 1, col. 8, line 51, "dispersed, phase" should read --dispersed phase--.

Claim 2, col. 8, line 64, "mixing aid" should read --mixing and--.

Signed and Sealed this

Twenty-ninth Day of May, 2001

Attest:

NICHOLAS P. GODICI

*Attesting Officer*    Acting Director of the United States Patent and Trademark Office